United States Patent
Pfitzmann et al.

(10) Patent No.: US 11,397,739 B2
(45) Date of Patent: Jul. 26, 2022

(54) AUTOMATED INFORMATION TECHNOLOGY SERVICES COMPOSITION

(71) Applicant: INTERNATIONAL BUSINESS MACHINES CORPORATION, Armonk, NY (US)

(72) Inventors: Birgit Monika Pfitzmann, Zürich (CH); Dorothea Wiesmann Rothuizen, Oberrieden (CH); Elizabeth Whittum Byrd, Kennesaw, GA (US); Herve Durand, Saran (FR)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/814,048

(22) Filed: Mar. 10, 2020

(65) Prior Publication Data

US 2021/0286813 A1   Sep. 16, 2021

(51) Int. Cl.
*G06F 16/2457* (2019.01)
*G06F 16/901* (2019.01)
(Continued)

(52) U.S. Cl.
CPC ...... *G06F 16/2457* (2019.01); *G06F 16/9024* (2019.01); *G06Q 10/06315* (2013.01);
(Continued)

(58) Field of Classification Search
CPC ............ G06F 16/2457; G06F 16/9024; G06Q 10/06315; G06Q 10/10; G06Q 30/016; G06Q 30/0201
(Continued)

(56) References Cited

U.S. PATENT DOCUMENTS 9,590,872 B1 *  3/2017  Jagtap ................. H04L 41/0886
10,541,938 B1 *  1/2020  Timmerman ......... H04L 47/783
(Continued)

FOREIGN PATENT DOCUMENTS

EP   2071451 A1   6/2009

OTHER PUBLICATIONS

Larvet, et al., "Discovery and auto-composition of semantic web services", International Conference on Software and Data Technologies, 2006 [accessed on Jan. 14, 2020], pp. 40-45, Retrieved from the Internet: <URL: https://pdfs.semanticscholar.org/d49b/28a97b571a69e4f669ac760d75acfa50e24c.pdf>.

(Continued)

*Primary Examiner* — Joshua Bullock
(74) *Attorney, Agent, or Firm* — Samuel A. Waldbaum

(57) ABSTRACT

Computer-implemented methods and systems are provided for identifying IT service compositions corresponding to subsets of a set R of IT service requirements. Such a method includes providing a data structure including, for a set S of IT services, a master graph having master nodes representing respective subsets of like services in S, interconnected by master edges each representing an integration-need between nodes interconnected by that edge. The method further comprises, for each service composition being a set of services, integrated by integration components and spanning all master nodes, in the composition subgraph, comparing the composite attributes of services and integration components in that composition with the requirements in R' to select at least one preferred service composition for R', and outputting composition data defining each preferred service composition.

20 Claims, 8 Drawing Sheets

(51) Int. Cl.
  *G06Q 30/00* (2012.01)
  *G06Q 10/06* (2012.01)
  *G06Q 10/10* (2012.01)
  *G06Q 30/02* (2012.01)

(52) U.S. Cl.
  CPC .......... *G06Q 10/10* (2013.01); *G06Q 30/016* (2013.01); *G06Q 30/0201* (2013.01)

(58) Field of Classification Search
  USPC ........................................................ 707/755
  See application file for complete search history.

(56) References Cited

U.S. PATENT DOCUMENTS

| | | | |
|---|---|---|---|
| 11,144,552 B2* | 10/2021 | Nanavati | G06F 16/282 |
| 2009/0216884 A1 | 8/2009 | Larvet | |
| 2014/0075032 A1 | 3/2014 | Vasudevan | |
| 2015/0170073 A1 | 6/2015 | Baker | |
| 2015/0227991 A1 | 8/2015 | Yu | |
| 2016/0203327 A1* | 7/2016 | Akkiraju | G06F 21/6227 707/785 |
| 2017/0243382 A1* | 8/2017 | Banerjee | G06Q 10/107 |
| 2021/0350274 A1* | 11/2021 | Pfitzmann | G06N 20/00 |
| 2022/0159461 A1* | 5/2022 | Maass | H04W 4/40 |

OTHER PUBLICATIONS

Li, et al., An Automatic Semantic Web Service Composition Method Based on Ontology, ICIS 2015, Jun. 28-Jul. 1, 2015, 4 pages, IEEE 978-1-4799-8679-8/15, Las Vegas, NV, USA.

Motahari-Nezhad, et al., "RFPCog: Linguistic-Based Identification and Mapping of Service Requirements in Request for Proposals (RFPs) to IT Service Solutions", [accessed on Jan. 22, 2020], 10 pages, San Jose, CA, US.

Wang, et al., "Automatic Web Service Composition Based on Uncertainty Execution Effects", IEEE Transactions on Services Computing, Jul./Aug. 2016 [accessed on Jan. 14, 2020], vol. 9, IEEE, pp. 551-565, Retrieved from the Internet: URL <https://ieeexplore.ieee.org/document/7060671>.

Wikipedia, "Predicate transformer semantics", From Wikipedia, the free encyclopedia, [accessed on Jan. 14, 2020], 8 pages, Retrieved from the Internet: <URL: https://en.wikipedia.org/wiki/Predicate_transformer_semantics>.

Zertal, "A Hybrid Approach for Optimized Composition of Cloud Services", ResearchGate Conference Paper, Mar. 2017 [accessed on Feb. 3, 2020], 3 pages, Retrieved from the Internet: <URL: https://www.researchgate.net/publication/318797260_A_Hybrid_Approach_for_Optimized_Composition_of_Cloud_Services>.

* cited by examiner

Request Subgraph

Composition Subgraph

Request Subgraph

Composition Subgraph

AUTOMATED INFORMATION TECHNOLOGY SERVICES COMPOSITION

BACKGROUND

The present invention relates generally to automated information technology (IT) services composition. Computer-implemented methods and systems are provided for identifying IT service compositions corresponding to subsets of a set of IT service requirements.

IT service compositions, often termed "IT solutions", are currently constructed ad-hoc to meet a particular customer's requirements. Such IT services cover a vast array of technology areas and service types. Individual services may relate to provision and/or management of any type of IT infrastructure, encompassing hardware and/or software across the entire spectrum of IT-related environments and delivery models, as well as a huge variety of supporting services associated with such infrastructure. Individual services, which may be selected from a range of proprietary offerings for particular types of service, must also be integrated into a cohesive solution fitting a customer's overall requirements. This often requires adaptation and/or extension of individual service offerings to achieve an integrated composition involving multiple component services.

New solutions are typically constructed by reusing prior solutions and adapting them to new customers' requirements. This leads to a proliferation of older solutions.

BRIEF SUMMARY

Additional aspects and/or advantages will be set forth in part in the description which follows and, in part, will be apparent from the description, or may be learned by practice of the invention.

According to one aspect of the present invention there is provided a computer-implemented method for identifying IT service compositions corresponding to subsets of a set R of IT service requirements. The method includes providing a data structure including, for a set S of IT services, a master graph having master nodes representing respective subsets of like services in S, interconnected by master edges each representing an integration-need between nodes interconnected by that edge. Each master node is associated with at least one requirement in R. The data structure also comprises, for each service in S, attribute data defining a set of attributes of that service and, for each of a set I of integration components for integrating service pairs in S, attribute data defining a set of attributes of that component. The method includes, in response to an input request comprising a subset R' of requirements in R, defining a request subgraph comprising master nodes which are associated with requirements in R' and master edges interconnecting those nodes in the master graph. The method also includes defining a composition subgraph by populating the request subgraph with services, selected from all subsets of services represented by master nodes in the request subgraph, having attributes fulfilling requirements in R', and with integration components for pairs of the selected services interconnected by master edges in the request subgraph. The method further comprises, for each service composition being a set of services, integrated by integration components and spanning all master nodes, in the composition subgraph, comparing the composite attributes of services and integration components in that composition with the requirements in R' to select at least one preferred service composition for R', and outputting composition data defining each preferred service composition.

Another aspect of the invention provides a system for implementing an IT service composition method as described above. A further aspect of the invention provides a computer program product comprising a computer readable storage medium embodying program instructions, executable by a computing system, to cause the computing system to implement such a method.

Embodiments of the invention will be described in more detail below, by way of illustrative and non-limiting example, with reference to the accompanying drawings.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
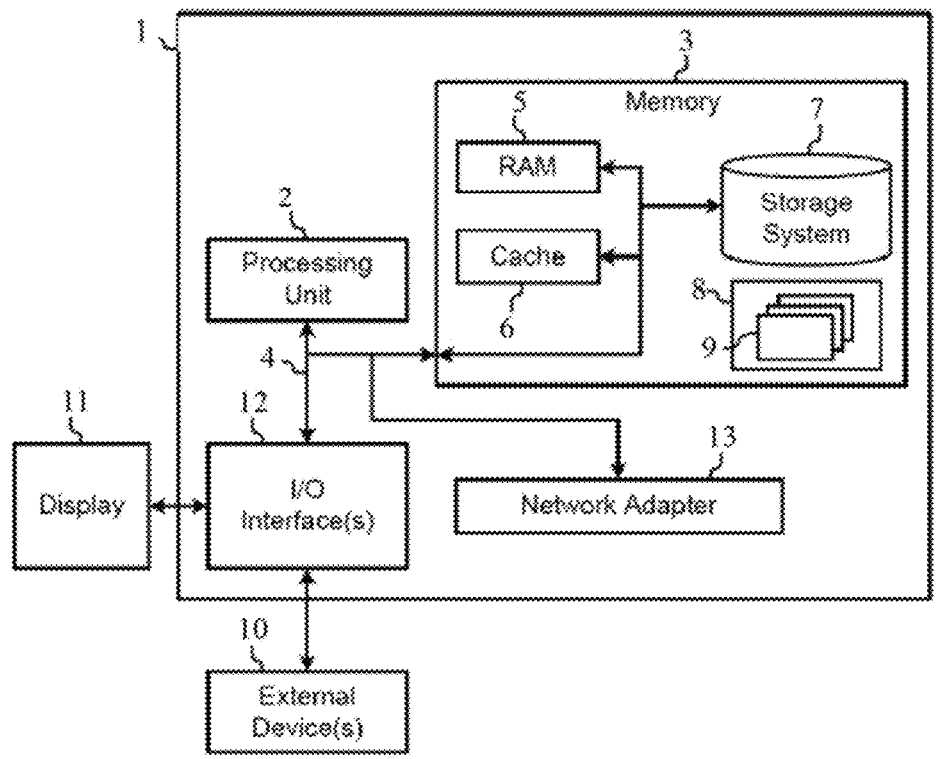
FIG. 1 is a schematic representation of a computing system for implementing IT service composition methods embodying the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for identifying IT service compositions. The methods may be implemented by a computing system comprising one or more general- or special-purpose computers, each of which may comprise one or more (real or virtual) machines, providing functionality for implementing the operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random-access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. It should be understood that although not shown, other hardware and/or software components could be used in conjunction with computer 1. Examples include, but are not limited to microcode, device drivers, redundant processing units, external disk drive arrays, RAID systems, tape drives, and data archival storage systems, etc.

Figure 2:
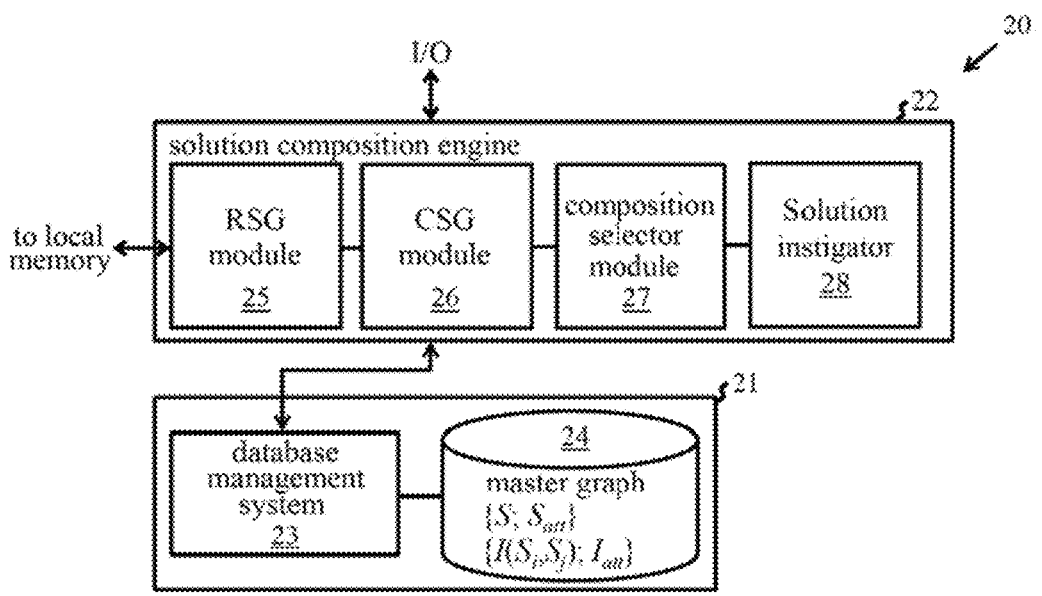
FIG. 2 illustrates component modules of a computing system embodying the invention.

FIG. 2 is a schematic representation of component modules in an exemplary computing system for implementing methods embodying the invention. The system 20 comprises a database 21 and control logic implemented here by solution composition engine 22. The database 21 comprises a database management system (DBMS) 23, and database memory 24. The solution composition engine 22 comprises a request subgraph (RSG) module 25, a composition subgraph (CSG) module 26, and a composition selector module 27.

Database memory 24 comprises one or more memory/storage components storing a data structure which provides the basis for IT service composition in system 20. The composition process involves identifying IT service compositions ("solutions") which correspond to subsets of a set of IT service requirements (R) defined for system operation. A solution comprises an integrated plurality of IT services which are selected from a set of available services (S) defined in system 20. The data structure stored in database memory 24 includes a master graph, having master nodes interconnected by master edges, which is constructed for the predefined service set S. As discussed further below, master nodes represent respective subsets of like services in S, and each master node is associated with at least one requirement in the requirements set R. Each master edge represents an integration-need between the nodes interconnected by that edge. That is, a master edge between two nodes $M_1$, $M_2$ signifies that a service represented by node $M_1$ needs to be integrated with a service represented by node $M_2$ if both services appear in a composition. The data structure also includes, for each service S in S, attribute data $S_{att}$ defining a set of attributes of that service. Similarly, for each of a set of integration components (I) for integrating particular service pairs in S, the data structure includes attribute data $I_{att}$ defining a set of attributes of that component I. Identifiers for the pair of services $(S_i, S_j)$ integrated by a component I may be stored along with the attribute data $I_{att}$ for that component as indicated in FIG. 2. However, association between service pairs and integration components can be indicated in any convenient manner in the data structure.

Attributes may be defined in various ways in the data structure. For example, attributes may be defined by strings with a defined format, such as key-value pairs or other tuples, comprising an element (a name, frame or key) which identifies an attribute type, and one or more elements specifying the attribute value(s) and any related object or other context for the attribute. Attributes correspond to requirements in the requirement set R, whereby elements of attributes can be mapped to elements of requirements as discussed further below. The attribute data $S_{att}$ for a service S will typically define multiple attributes, such as service type, availability, activities covered, location, etc., of the service as well as a cost attribute indicating a cost metric for the service. Such a cost metric may indicate actual monetary cost directly, a value on some defined cost-scale, and/or may indicate a set of unit costs for component units of a service where appropriate, whereby total cost can be estimated for particular instances of the service. The attribute data $I_{att}$ for an integration component I can typically be simpler, and in some embodiments may simply comprise a cost attribute indicating a cost metric for the component. This cost metric may be different to that for services, e.g. indicating a level of integration effort/complexity/difficulty, etc., on some defined scale, and/or may indicate monetary cost. Some integration components may also have additional attributes, similar to those for services, as appropriate.

The data structure described above can be stored in database 21 using various data structure formats. The master graph, for example, may be defined via native graph storage, which is specifically designed around the structure of the graph, or non-native storage such as a relational or object-orientated database structure.

Database management system 23 typically comprises a set of program modules providing functionality for maintaining, updating, and accessing the data structure in database memory 24.

Such management systems can be implemented in generally known manner, and the particular implementation is orthogonal to operations described herein.

Modules 25, 26 and 27 of composition engine 22 comprise functionality for implementing particular steps of the solution composition process detailed below. Functionality of these modules may be implemented by software, e.g., program modules, or hardware or a combination thereof. These modules interface with database management system 23 to retrieve data from database memory 24 and can store data in local system memory during processing. One or more input/output (I/O) channels provides for communication between composition engine 22 and operators/users of the system, for example via a graphical user interface (GUI) provided at one or more user computers which may be local or remote from system 20. The component modules of system 20 may be provided in one or more computers of a computing system. For example, all modules may be provided in a computer 1 at which a GUI is displayed to an operator. Alternatively, for example, system 20 may be implemented in a client/server system comprising one or more servers to which user computers (clients) can connect via a network. Such a server system may be implemented as a front-end/back-end system in which a back-end server provides database 21 and a front-end computer/server implements composition engine 22. Front-end functionality may be implemented entirely in a user computer, or composition engine 22 may be wholly or partially implemented in a server which communicates with user computers, e.g. via a browser, and interacts with a back-end database server. System 20 may also be implemented in a cloud computing environment in which modules are implemented as microservices.

Solution instigator 28 instigates the implementation of the solution, once a selection has been received. The solution instigator 28 module then communicates with the owning service provider's IT management tools belonging to the offerings and integration components in the selected solution, requesting them to set up the solution as far as the offerings and integration components are already automated. For instance, the solution instigator may instigate the setting up of a Service Desk instance for the new customer. It may also request Cloud virtual machines or Cloud storage and trigger the capacity management on the Cloud system to reserve space for a large set of customer systems to be migrated soon. Similarly, it might request LPARs and storage on a shared mainframe. It may also request new installations of tools for monitoring, patching, backup, and security for this customer, or to customer-specific workspaces within shared tools if the customer requirements allowed shared services. The IT management tools in turn may communicate with the Customer IT systems, e.g., to migrate operating system instances to a cloud, or to start actually monitoring, patching, backup, and security validations on these systems. If a migration offering is involved, the migration management tool may actually transfer customer systems (such as OS images, virtual machines, or containers) and data over the network so that they run in a new place, e.g., on a cloud. For security reasons, there needs to be a technical authorization step before such actual access to customer IT systems, at least if the solution is for a new customer, because the Customer IT systems have hopefully been managed well enough to not allow unknown external tools access without any credentials. The workflow for this credential exchange may also be automated in the Solution instigator. Not all offerings and in particular not all integration components are fully automated at present; however, the idea with predefined offerings is that at least they have well-defined operational procedures. In such cases, the solution instigator can trigger these procedures if formal workflows or contact points for them are given. For instance, for physical migration of objects to a different data center, the solution instigator can inform the migration management tool of the types and quantities of the objects as obtained in the requirements (disk storage devices, printers, tape libraries, tapes, and the like), and the migration management tool may output a phased migration plan, and even order the packing material and trucks for this plan.

In operation of system 20, the system identifies one or more solutions which best match a specified subset of the set R of IT service requirements. In particular, the requirements set R is defined in terms of elements, e.g. text elements, from which individual requirements can be constructed as strings with a defined format. For example, requirements can be defined in terms of key-value pairs or other tuples in a similar manner to the specification of attributes, and can be formatted as strings in which elements can be clustered and/or arranged hierarchically to provide context for elemental requirements, e.g. to define "sub-requirements" for a main requirement. Various data formats, such as JSON (JavaScript Object Notation), XML (Extensible Markup Language), OWL (Web Ontology Language), CSV (Comma-Separated Values) and spreadsheets, may be used for defining requirements. A similar format and/or element definition is preferably used for attribute data to simplify mapping between requirements and attributes during system operation.

Figure 3:
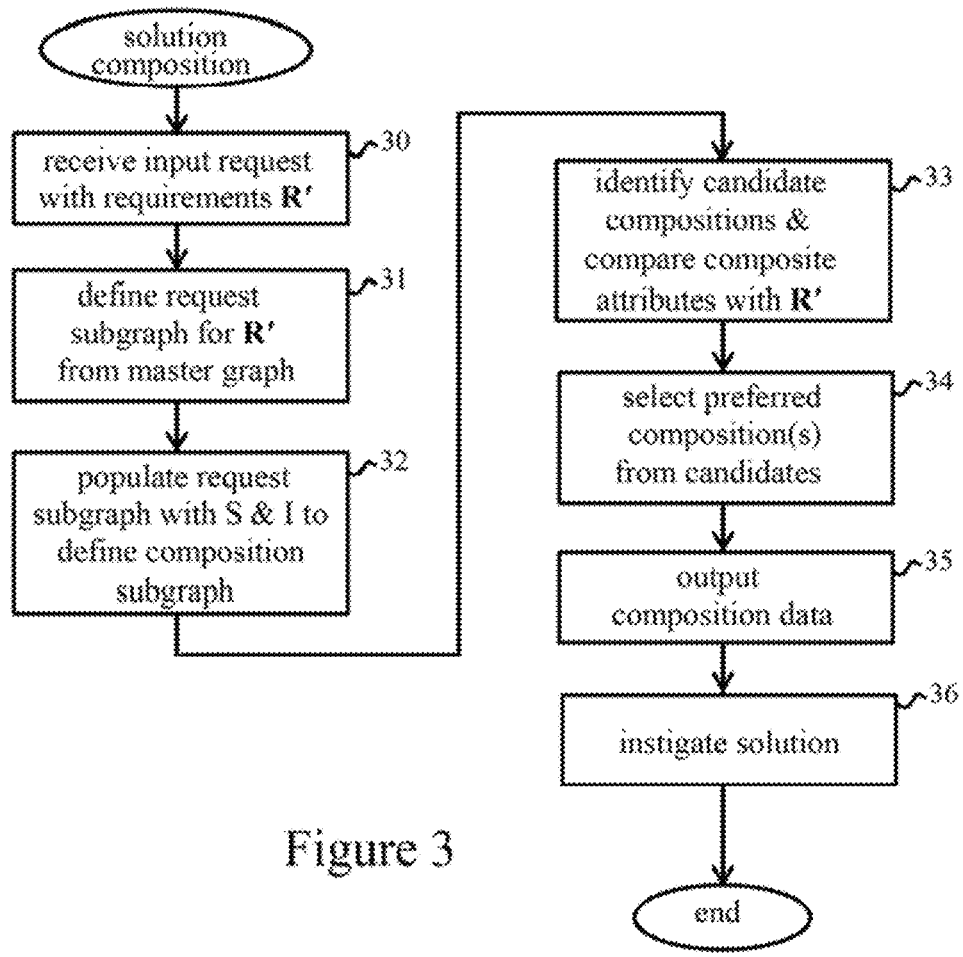
FIG. 3 indicates steps of an IT service composition method embodying the invention.

FIG. 3 indicates basic steps of the solution composition method in system 20. In step 30, composition engine 22 receives an input request defining requirements for the solution to be composed. The input request comprises a subset R' of requirements in the predefined requirements set R. Individual requirements r' in R' may be obtained in various ways. For example, requirements r' may be obtained from operator input, e.g. by selecting options from menus displayed in a GUI, or may be generated from a text file, e.g. a scanned document, via an automated text analysis process. The requirements R' input in step 30 are stored in local system memory. In response to the input request, RSG module 25 defines a request subgraph in step 31. The request subgraph is generated from the master graph in database memory 24 by a process illustrated in FIGS. 4a and 4b.

Figure 4A:
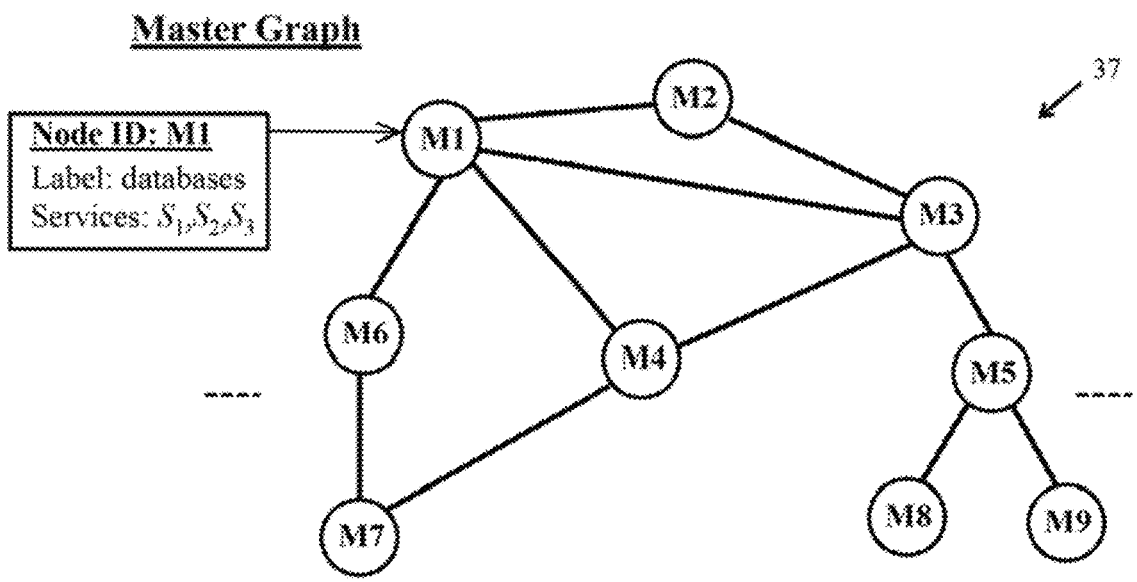
FIGS. 4a to 4c illustrate features of graphs used in the FIG. 3 method.

FIG. 4a illustrates a portion of a master graph 37. All master nodes are identified by unique node identifiers (IDs) in the graph, and each master node represents a respective subset of like services in the service set S. For example, a master node may represent a group of services of the same general type, e.g. all relating to mainframe systems, or databases, or operating systems, and so on. Individual services represented by a master node may differ in certain attributes, but all are classified as broadly similar according to the classification system used for master graph construction. Each master node is associated with at least one requirement r in the requirements set R via a predetermined mapping between master nodes and requirements. For example, mapping of a master node to one or more requirements may be determined from the common attributes of services S which it represents, or from attributes/properties/labels specifically assigned to master nodes, e.g. defining a service type (and possibly other attributes) of its service subset, which correspond to elements of requirements in R. In the example of FIG. 4a, the master nodes have labels which indicate service type and map to requirements in R for the respective types of service. For example, Node M1 has a label "Databases" which may map to a requirement r="systems managed: database" and/or to a set of such requirements specifying particular database types, e.g., r="systems managed: databaseX". The services represented by Node M1 are indicated here via an attribute (Services: $S_1$, $S_2$, $S_3$) of that node.

Figure 4B:
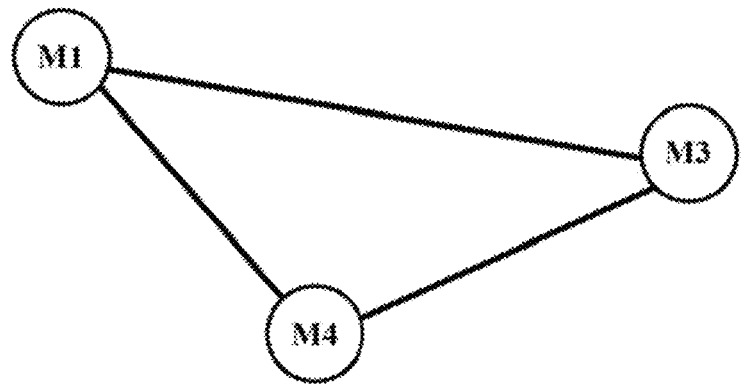

FIG. 4b shows a simple request subgraph generated by RSG module 25 in step 31 of FIG. 3. The RSG module analyses the input requirements r' in R' to identify master nodes associated with these requirements via the requirements-to-node mapping defined in this module. After mapping requirements to master nodes, the RSG module accesses database 21 to identify all master edges interconnecting those nodes in the master graph. The RSG module thus defines a request subgraph for the input request as illustrated, where this example assumes that nodes M1, M3 and M4 in the master graph mapped to requirements in R'. The resulting request subgraph is stored in local system memory in step 31 of FIG. 3.

The request subgraph provides a template for composition of solutions specific to the requirement set R'. In step 32, the CSG module 26 uses the request subgraph to define a composition subgraph for the input request. The composition subgraph is defined here by populating the request subgraph with services and integration components. The CSG module selects these services from all subsets of services represented by master nodes in the request subgraph. For each master node in the request subgraph, the CSG module accesses database 21 to retrieve the attribute data $S_{att}$ of each service represented by that node and compares the attributes with requirements in R'. For each node, the CSG module selects at least one service having attributes fulfilling requirements in R'. The extent to which attributes must fulfil requirements here may vary. For example, a simple fulfilment function may simply output "true" or "false" for fulfilment of a particular requirement or set of requirements. In some embodiments, discussed further below, a weighting scheme may be applied for the degree of requirement-fulfilment by particular attributes and/or services. Various approaches can be envisaged here with the objective of selecting, for each master node, at least one service which fulfils (or best fulfils) the requirements.

Figure 4C:
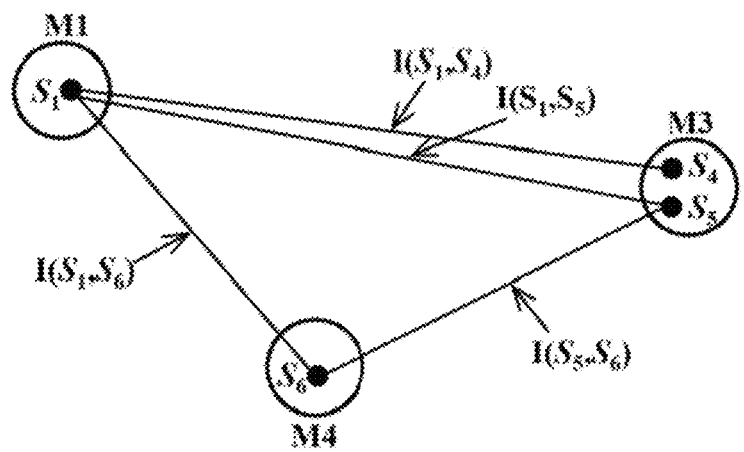

After selecting services to populate the request subgraph, the CSG module then identifies integration components for these services. In particular, for each pair of the selected services interconnected by a master edge in the request subgraph, the CSG module accesses database 21 to identify any integration component for that service pair. The resulting composition subgraph is thus defined as illustrated in FIG. 4c. Edges here represent integration components I between pairs of services S. In this example, integration components were defined in database 21 for all service pairs except ($S_4$, $S_6$). The attribute data for all services and integration components in the composition sub-graph can be stored in local system memory step 32 of FIG. 3.

In step 33, the composition selector module 27 uses the composition subgraph to identify candidate service compositions for the requirement subset R'. A candidate composition is defined here as a set of services which are integrated by integration components and span all master nodes in the composition subgraph. For each candidate composition, selector module 27 compares the composite attributes of services and integration components in that composition with the requirements in R'. In step 34, the selector module 27 uses the results of this comparison to select at least one preferred service composition for R'. Various criteria may be applied here for selecting preferred service compositions. Typically, however, a composition will be selected in dependence (at least in part) on the extent to which the composite attributes fulfil requirements in R'. Preferred service compositions may also be selected in dependence on overall cost determined from cost metrics defined by attributes of component services, and also integration costs as indicated by cost metrics for integration components. By way of example, the selector module 27 may choose one composition which most closely matches the requirements, or has lowest overall cost, or choose a set of the candidates which have different requirements coverage but which are similar according to some overall preference measure, e.g. cost or some function of cost and requirements coverage.

In step 35 of FIG. 3, the selector module 27 then outputs composition data defining each preferred service composition. Such composition data may include composition details and results of the comparison performed by the selector module 27, e.g. to indicate requirements coverage and estimated costs. The composition data may further include a detailed description of everything needed by the engineers to later implement the solution.

In step 36 of FIG. 3, the solution instigator module instigates the solution in interaction with the service provider's IT management tools, and ultimately the Customer IT systems, as described above.

The above method enables automation of IT solution composition by adopting a new approach based on a specific data structure and an associated set of computer-implemented rules for using this data structure to compose solutions in a highly efficient manner. The huge variety and complexity of different IT services, and the need for integration of services into cohesive solutions, have posed significant challenges to automation of solution composition, and even to human construction of solutions resulting in solutions being produced by recycling old solutions as discussed earlier. The above process not only overcomes these problems, it offers extremely efficient implementation by virtue of the particular processing steps performed using the underlying data structure. The master graph 24 in this data structure abstracts the complexity of the underlying services to the essential integration level, providing a simple framework for solution composition. Any type of solution can then be constructed via a simple two-stage process in which the request subgraph is first defined from the master graph 24 as a template for composition, and the composition subgraph is then defined by comparing attributes associated with relevant services, determined from the request subgraph, with the input requirements. Integration components are also accommodated at this stage, allowing integrated compositions to be assessed efficiently from the composition subgraph and preferred solutions selected. This provides an elegantly simple and practical approach to the hugely complex task of solution composition. The entire space of IT services is reduced to that of the composition subgraph which is dynamically defined for arbitrary requirement sets. This reduced space can be analyzed much more efficiently than the overall solutioning space in database 21. The best candidates can thus be quickly and easily identified for any set of requirements relating to all types of solution across the entire spectrum of IT services.

The set of services S in systems embodying the invention may comprise, for example, services for provision of IT infrastructure objects, services for management of IT infrastructure objects, and/or support services for IT infrastructure objects. Infrastructure objects may be both hardware and software objects. Hardware objects may include any type of hardware, such as computing, storage, network, etc. devices, systems and associated equipment. Software objects may similarly include any software items, including operating systems, middleware and applications (including containers), etc. In preferred embodiments, IT infrastructure objects may comprise: servers, operating systems, cloud computing systems, datacenters, storage systems, networks, databases, middleware and applications, as well as computing devices such as desktop computers, mobile computing devices (e.g. laptops, tablets, phones, etc.) and IoT (Internet of Things) devices (e.g. sensors and actuators).

Services for provision of infrastructure may relate to acquisition, supply, set up, transformation, installation, etc., of hardware and/or software. Services for infrastructure management may relate to maintenance, monitoring, repairing, upgrading, patching, tuning, testing, backup, mirroring, tracking, security management and disaster recovery readiness/testing, etc., of infrastructure. All delivery models, including cloud based XaaS (Anything as a Service) models can be accommodated by such services. Support services may relate to consultation, planning, development, disaster recovery, training, service desks with web, phone, email, etc., interfaces, as well as other assistance such as advising, reporting, etc.

In preferred embodiments, the set of attributes of each service comprises attributes indicating a respective plurality of: a cost metric for the service, object type, object ownership, management activity types, availability, supply-locations, delivery-locations, support service channels, and provisions of a Service Level Agreement (SLA) for the service. Such SLA provisions may address, for example: incident response times, incident resolution times, availability parameters, regulatory provisions, compliance, governance, performance parameters, security features, disaster recovery features, supported languages, license models, maintenance windows, documentation and reporting. Particular services may have attributes relating to further aspects of a service, e.g. transformation aspects such as analyzing architecture of existing customer systems and transformation to a new architecture, and any specific exclusions (e.g. certain costs such as planning costs).

Figure 5:
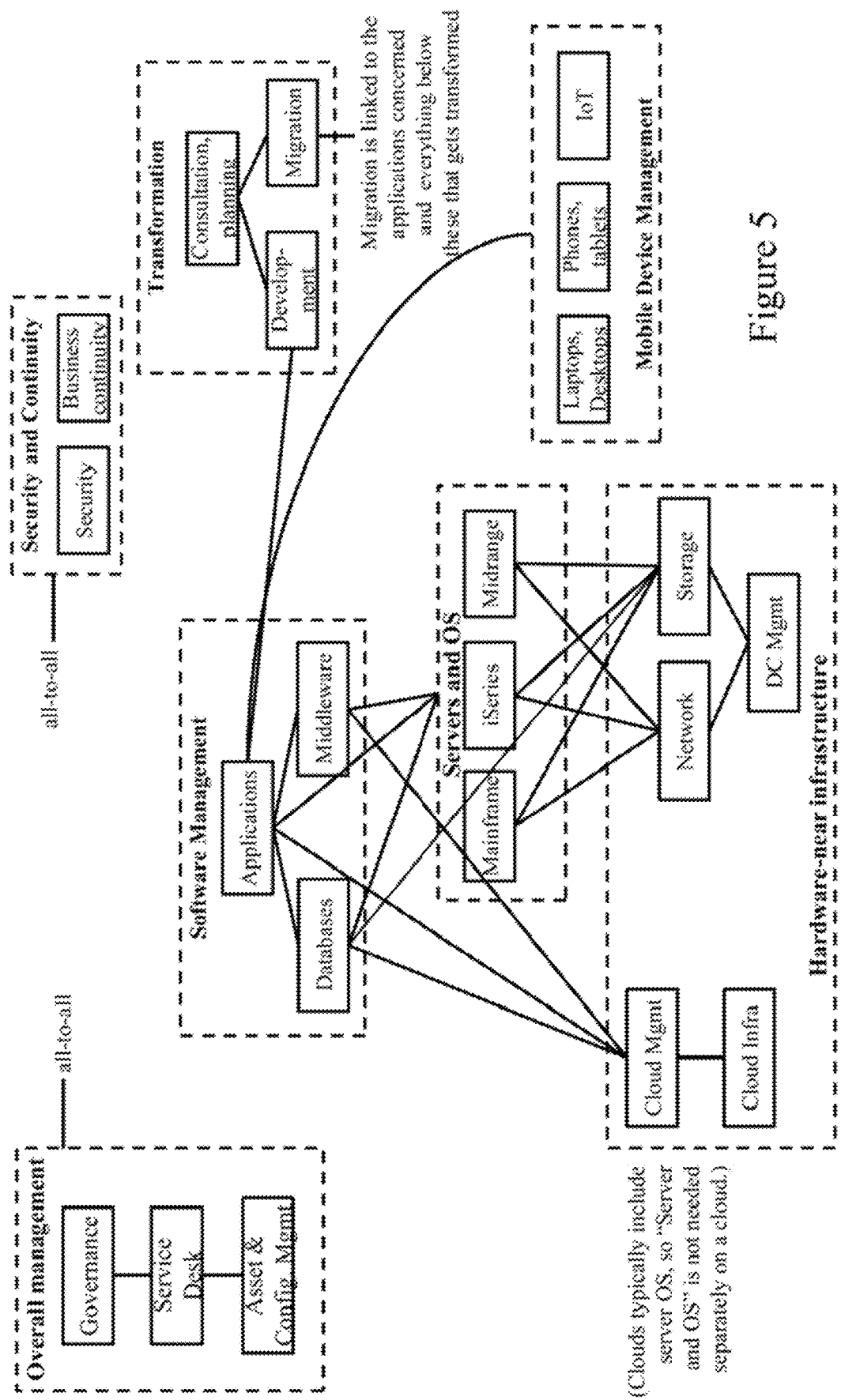
FIG. 5 is a schematic representation of a master graph in an embodiment of the invention.

An exemplary embodiment is described in more detail below with reference to FIGS. 5 through 8d. FIG. 5 is a schematic representation of a master graph 24 in the data structure of this embodiment. Master nodes are represented by the small rectangles labelled with the general service-type represented by each node. The larger dashed rectangles indicate general categories of master nodes as referenced in the following description. Master edges are only partially indicated in the figure to avoid over-complication. In particular, lines terminating at a dashed rectangle signify master edges to/from all master nodes in that rectangle. Lines labeled "all-to-all" signify master edges from all nodes in a dashed rectangle to all other master nodes. Additional master edges are indicated by specific line-labels in the figure. Services represented by the various master nodes are indicated in the following list.

Overall Management:

Governance: services relating to overall relationship with the client, reporting, key performance indicators, etc. Asset and Configuration Management (Config. Mgmt.): services relating to tracking hardware and software objects and their configuration, typically using a Configuration Management Database (CMDB). Service Desk: services relating to provision and management of service desks for handling of incident tickets, change requests, service requests, etc., from the client. This typically has a web interface as well as phone and other channels. This needs a link to the CMDB to see what a request is about, to store the results of fulfilling a change request, etc.

Hardware-near infrastructure management: Data Center management (DC Mgmt.): services relating to provision and management of data centers including handling floor space, cabling, cooling, etc. Cloud Infrastructure (Infra.): services relating to provision of a public or private cloud including its own hardware and software (which need not be service offerings of the same provider). Cloud Management: services to make a cloud useful for an enterprise customer, e.g., establishing private connections, user groups, authorizations, billing systems, capacity reserves, etc. Storage: services relating to provision and management of Storage-Area Networks or Network-Attached Storage, and storage virtualization. Network: services relating to provision and management of physical networks (switches, routers, gateways, etc.) as well as network virtualization.

Mobile Device Management. Each of these master nodes covers services relating to acquisition, installation, roll-out, deposition, authorization into an enterprise network, etc., of certain device types: Laptops and desktops; Phones and tablets; IoT sensors and actuators.

Servers and operating system (OS) management. Each of these master nodes covers services relating to provision and management of servers and operating systems including monitoring, patching, upgrading, fixing, back-up, etc. of a particular OS type (including many automation scripts, as well as experts for complex tasks and problem solving): Mainframe; iSeries; Midrange servers (Linux, Windows, other Unix variants).

Software management. Each of these master nodes covers services relating to provision and management, including installation, performance tuning, monitoring, patching, upgrading, fixing, back-up, etc., of a type of software (also including automation scripts, as well as human experts for complex tasks and problem solving): Databases; Middleware; Applications.

Security and Continuity. These master nodes cover services driven by compliance requirements and industry standards, as well as provider and client best practices. Security: services relating to anti-virus, intrusion detection, encryption, configuration checking, firewall management, etc.

Business Continuity: disaster recovery readiness via mirroring, standby systems, disaster recovery testing.

Transformation. These master nodes cover services relating to changing from the current state of the client to a required new state, e.g., moving systems to a cloud, reducing the number of different operating systems, databases, etc., in use, and so on. Consultation and Planning: services relating to assessing the current state and what can be transformed at reasonable cost, plus how to achieve this and in what timeline, etc. Migration: services relating to infrastructure-level transformation, e.g., moving an OS with the contained software and databases to a cloud, or moving data from one database to another, etc. Development: services relating to changes or new development for application software, i.e., programming.

It will be appreciated that the master nodes could be defined and organized in different ways in other embodiments. As illustrative examples, the storage node could be split into separate nodes representing storage for distributed servers and storage for mainframe, or different master nodes could be assigned to each OS type, or Transformation Consultation and Planning could be split into specific nodes such as Cloud Consulting, Security Consulting, etc.

Figure 6:
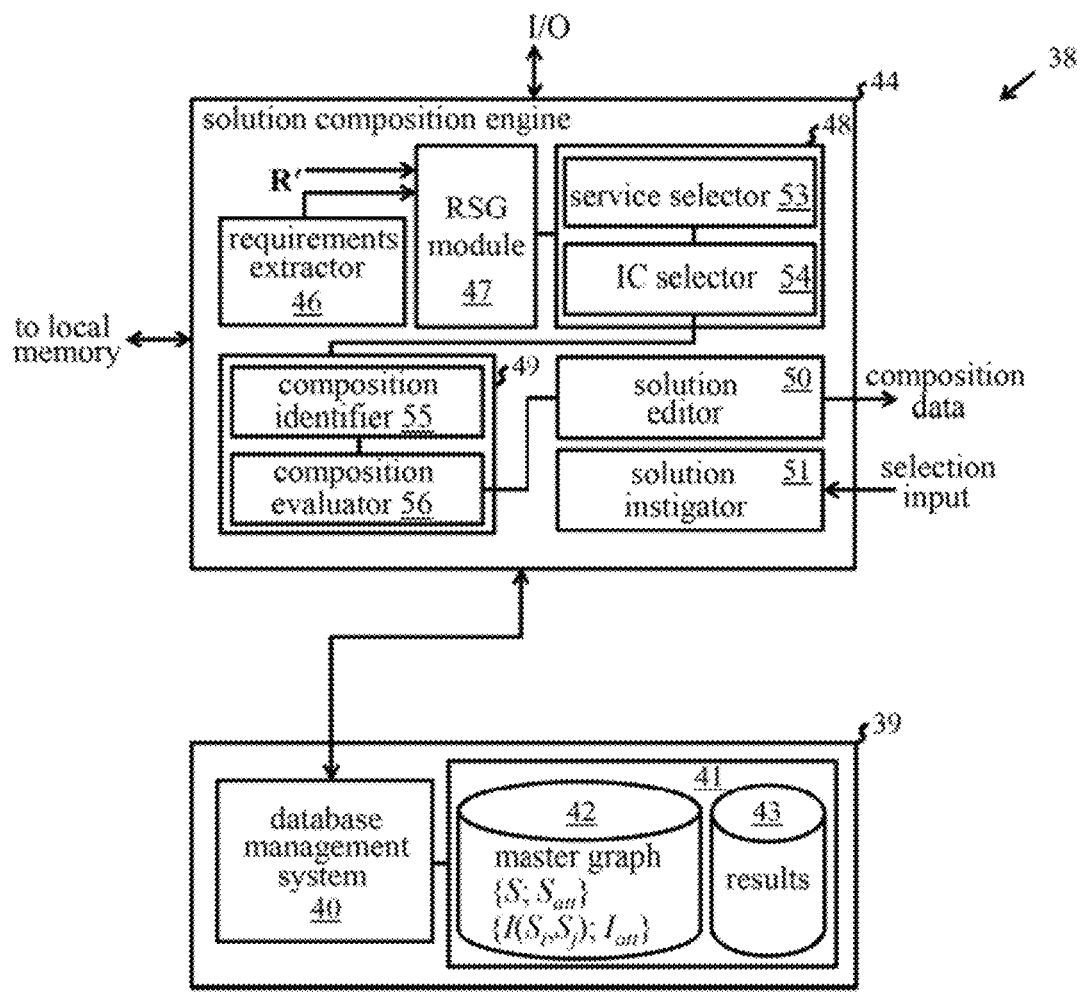
FIG. 6 illustrates more detailed modular structure of a computing system embodying the invention.

FIG. 6 illustrates component modules of the system 38 of this embodiment. Database 39 comprises database management system 40 and memory 41 comprising one or more storage components storing the data structure 42 for the system. Memory 41 also stores a results data structure 43 in this embodiment. Data structure includes the master graph 42 described above, along with the attribute data $S_{att}$ for all services S represented by the master nodes and attribute data $I_{att}$ for all integration components defined in the system. The requirements set R and all attributes and are defined in JSON format in this embodiment. Service attributes may be defined manually for individual services, or service attributes may be wholly or partially defined via automated text analysis of service documentation. Integration components for service pairs can be identified from existing components where available (e.g.: software interfaces between infrastructure objects, automated adaptors/translators between different service interfaces and/or automation scripts; manually-implemented ("swivel chair") interfaces between different services; combinations of automated interfaces/adapters and/or communication setups for humans already established for existing services or prior solutions). Attributes for these integration components can be defined wholly or partly by automated processes, e.g. if components are documented or have been used in prior solutions and costing tables are available. In this embodiment, at least a cost attribute is defined for each available integration component based on known costs for that component. If a particular integration component has not yet been built but its construction is easily defined, e.g. based on parameters of similar components, then a cost attribute indicating estimated cost can be defined for that component. If an integration component for a particular service pair is unavailable and its definition is not readily envisaged, then a cost attribute indicating a high cost (reflecting the expected difficulty/effort level and hence high monetary cost) may be defined. Alternately, no integration component may be defined for the service pair. Integration components may also be assigned other attributes, e.g. how many requests can be handled per hour, availability parameters, etc., as appropriate.

The solution composition engine 44 comprises a requirements extractor module 46, an RSG module 47, a CSG module 48, and a composition selector module 49, a solution editor module 50, and a solution instigator module 51. The CSG module 48 comprises a service selector 53 and an integration component (IC) selector 54. Composition selector module 49 comprises a composition identifier 55 and a composition evaluator 56.

Operation of system 38 will be described with reference to the flow diagram of FIG. 7. In step 60, composition engine 44 receives an input request defining requirements for the solution to be composed. The input request may directly specify a subset R' of requirements, e.g. input via a GUI, in which case R' is supplied to RSG module 47. Alternatively, a textual input request (e.g. an email or scanned Request for Proposal (RFP) document) may comprise a text file which is supplied to requirements extractor module 46. This module uses NLP (Natural Language Processing) and machine-learning techniques of generally known type to identify requirements by analyzing text in the input file. (An example of such automated requirements extraction process is described in "RFPCog: Linguistic-Based Identification and Mapping of Service Requirements in Request for Proposals (RFPs) to IT Service Solutions", Motahari-Nezhad et al., Proc. 2016 49th Hawaii International Conference on System Sciences (HICSS), 1691-1700). The extracted requirements R' are then input to RSG module 47.

In step 61, the RSG module maps requirements in R' to nodes of the master graph based on the predetermined node-requirements mapping defined in this module. In step 62, the RSG module defines the request subgraph for R' as described above. The request subgraph is stored in local system memory for access by CSG module 48. In this embodiment, the input requirements R' and the request subgraph are also stored in results data structure 43 of database 39. In step 63, the service selector 53 of CSG module 48 retrieves the attribute data $S_{att}$ of services represented by each master node in the request subgraph. For each service, the service selector checks the extent to which requirements in R' are fulfilled by corresponding attributes of that service. In step 64, the service selector selects, for each master node, one or more services which fulfill requirements in R' to a required extent. In step 65, the service selector stores fulfilment parameters for its selection in local system memory. Fulfilment parameters may identify, for example, the attributes of selected services, any parameters of that service (e.g. particular sub-offering types or service levels) used in fulfilment assessment, and a fulfillment list or other measure indicating the extent to which requirements are fulfilled. The selected services, attributes $S_{att}$ and fulfilment parameters are also stored in results data structure 43.

In step 66, IC selector 54 identifies pairs of the selected services which are interconnected by a master edge in the request subgraph. In step 67, the IC selector accesses database 39 to identify any integration components, with their attributes $I_{att}$, for these service pairs, and defines the composition subgraph for the selected services and integration components. The composition subgraph, including the integration components and attributes $I_{att}$, is also stored in results data structure 43. In step 68, the composition identifier 55 of composition selector 49 identifies the candidate compositions, comprising integrated services spanning all master nodes, from the composition subgraph. In step 69, the composition identifier computes global attributes, including cost, of each composition from its composite attributes as explained below. In step 70, the composition evaluator 56 then evaluates the candidate compositions for cost and requirements coverage as detailed below. Based on this evaluation, one or more preferred compositions are then selected in step 71. Parameters of the preferred composition (s), e.g. the constituent services and integration components, the global attributes and evaluation results, are stored in local memory for access by solution editor 50. These parameters are also stored in results data structure 43.

In step 72, solution editor 50 composes parameters of the preferred compositions into composition data for a solution proposal which is output in step 73. Such a solution proposal may be output in a document format, or presented via a GUI, to give all relevant solution details and a comparison of solutions where more than one is identified, e.g. using spider diagrams. Such a solution proposal may incorporate text used in descriptive attributes of constituent services and integration components where provided in the attributes set. The solution proposal is also stored in results data structure 43 for the input request, whereby the collective results of the composition process are available for user analysis. Multiple users may access and review these results which provide a complete audit trail for the composition process.

In step 74, a solution instigator module 51 is responsive to a subsequent selection input, selecting a proposed solution, after output of a solution proposal. This module includes functionality for instigating implementation of services in the selected composition. This process may be controlled via automation scripts in solution instigator 51. Implementation may be fully automated for some solutions. As an illustrative example, a fully specified mainframe could be moved to zCloud by automatically provisioning LPARs (Logical Partitions) enabling the migration. For other solutions, solution instigator may initiate implementation of services, implementing steps via automated processes as far as possible. The solution instigator may also communicate with providers of services in the selected composition, using service provider contact details determined from attributes, to initiate service implementation.

Figure 7:
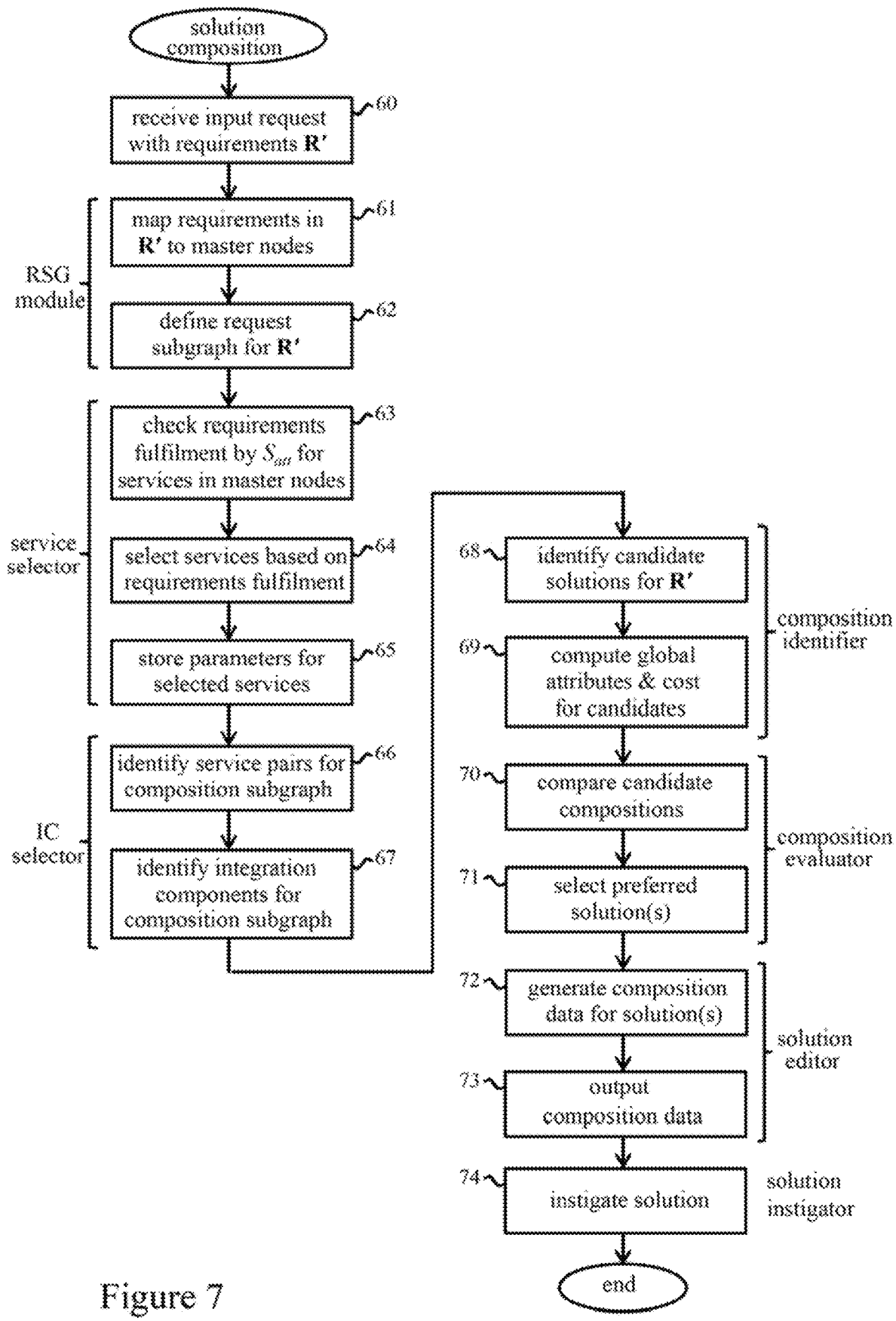
FIG. 7 indicates steps of an IT service composition method performed by the FIG. 6 system.

In step 63 of FIG. 7, the service selector may assess fulfilment of requirements in various ways. A simple "true" or "false" assessment may be applied for certain, "hard" requirements, e.g., a requirement to deliver into a particular country, while applying a weighting scheme to other, "soft" requirements, such as SLA requirements which are often negotiable. Weighting can be particularly useful for SLA requirements such as availability and response times, where the difference between required and offered percentage or time can make negotiation easier or harder. Weighting may thus be used to measure the likelihood of a soft requirements mismatch being acceptable in the fulfillment assessment for a service.

Computation of global attributes from composite attributes in step 69 of FIG. 7 can be performed on a requirement-by-requirement basis for requirements in R'. Attributes of all components (services and integration components) of a composition are considered here. Global cost can be calculated as the total cost for all components. Particular examples for other attributes are given in the following.

For an availability requirement, all components of a composition are typically needed (no software redundancy), hence: Global Availability (composition)=Product of Availability (component). If availability is required separately for a certain subset of components, then this formula is applied only to that, and the same applies to the following formulae. Infrastructure common to components can also be treated as a separate component in this formula. For response time to human input: Global Response time (composition)=Max (Response time (component)). For reaction time to an incident (specific to a particular monitoring area): Global Reaction time (composition)=Max(Sums of reaction time (component) over component chains in the composition).

For requirements relating to delivery attributes: Global Delivery organizations (composition)=Set of (Delivery organization (component)). (There may be no requirement about this as it is internal to the organization building the solution, but it is better if smaller to reduce internal overhead). For delivery models, e.g., public cloud, private cloud, on premise: Global Delivery models (composition)=Intersection of (Delivery models (component)). (This assumes that the entire delivery should be in one model, e.g., all on premise or all shared. If the requirements specialize, this can be done by component groups, e.g., of the public and private cloud). For a target region (i.e. country or other geographic limitation), e.g. where a solution is available: Global Target region (composition)=Intersection of (Target region (component)). For an administration region, i.e., where the service personnel are located: Global Administrative region (composition)=Union of (Administrative region (component)). Other global attributes can be similarly calculated via union or intersection formulae as appropriate.

For evaluation of candidates in step 70 of FIG. 7, the composition evaluator may calculate coverage of a candidate solution as the percentage of requirements it fulfils for each master node of the request subgraph. For example, if $R'_M$ is the subset of R' corresponding to a master node M, and $R'_{Mc}$ is the subset of $R'_M$ fulfilled by a candidate solution c, (i.e., by the service S from c that belongs to node M), then $|\cup_M R'_{Mc}|$ is the number of fulfilled requirements over all the master nodes. This value is then divided by |R'|. In addition to fulfilment parameters stored in step 65, the evaluator assesses global attributes in relation to individual requirements in R'. This process may again distinguish between soft and hard requirements, using weighting where appropriate, to assess fulfillment of requirements. Selection of preferred candidates can then be based on a trade-off between cost and overall requirements coverage.

Operation of the above system is demonstrated by the following simple example. A simplistic requirement set R for this example may be defined by the following elements. (A semi-formal notation is used for the requirements format here). A) "Systems managed" with any software or hardware product name, e.g., Windows, Red Hat Linux, Ubuntu, AIX, zOS, DB2, Microsoft SQL Server, and possibly a version. An exemplary requirement r in this group could be (Systems managed, Red Hat Linux, 6.10 to 8). B) "Activities", which should be performed on the managed systems, e.g., install, monitor, backup, patch, upgrade, virus-check, etc. A second element here may specify an object from "Systems managed". Exemplary requirements in this group could be: (Activities, backup), meaning that all systems should be backed up; (Activities, virus-check, Windows) meaning that all Windows systems should be virus-checked; and (Activities, upgrade, Midrange servers) meaning that all objects under a node "Midrange servers" in the object hierarchy (such as Windows, Red Hat Linux, Ubuntu and AIX in the above list) should be upgraded. C) "Channels", i.e., how the client and the service provider interact. Exemplary requirements in this group could be (Channels, incidents, web) and (Channels, incidents, phone) indicating that there should be a web interface and a phone interface for incident reports.

Requirements in groups (A) to (C) above are examples of functional requirements. Additional, non-functional requirements may be defined by the following elements. i) Availability, i.e., what percentage of time a system should be available to a user. Exemplary requirements in this group are: (Availability, 99.5%, Red Hat Linux); (Availability, 99.9%, Mainframes); and (Availability, 99.8%, Database clusters), where "Database clusters" may be another element under "Systems managed". ii) Support from location, i.e., restrictions on location of the people managing a system. Exemplary requirements in this group are (Support from location, USA) or (Support from location, EU) where, again, there may be a hierarchy of location elements such as "EU" for a specified subset of European countries.

Other examples of non-functional requirements may relate to response and resolution times for incidents, e.g., (Resolution time, Severity 1 incident, ≤4 hours, in 90% of cases)", regulations to be fulfilled, service hours, and further location constraints.

A requirements subset R' for this example may define requirements paraphrased as follows:
Systems managed: Windows 2012, Red Hat Linux 7.1, z/OS.
Activities: Install, uninstall, start, stop, monitor, backup, patch for all managed systems; Virus-check only for Windows; Store configuration; provide web service request masks
(Channels, incidents, web).
(Availability, 99.5%, All Servers).
(Support from location, EU).

Figure 8A:
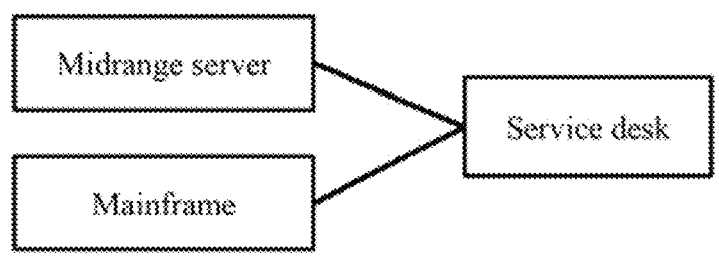
FIGS. 8a to 8d illustrate stages in operation of the FIG. 7 method for exemplary requirements.

Of the systems managed in these requirements, Windows 2012 and Red Hat Linux 7.1 map to the Midrange Server node in FIG. 5, and z/OS maps to the Mainframe node. The activities requirements "Store configuration, provide web service request masks" map to the Service Desk node. The request subgraph generated by RSG module 47 here is shown in FIG. 8a.

Service selector 53 finds two services which match all requirements in the service subset of the Midrange Server node, an on-premise (OP) midrange server and a cloud (CL) midrange server service. These are defined by the following (summarized) attributes:
OP Service: Systems managed: Windows, Red Hat Linux, SuSE Linux, Ubuntu, AIX, Solaris, HP-Unix. (e.g. (Systems managed, Red Hat Linux) without version restriction, etc.).
Activities: Install, uninstall, start, stop, monitor, backup, patch, upgrade for all managed systems. Virus-check only for Windows and the 3 Linux variants, (Activities, virus-check, Windows), etc.
(Availability, 99.5%, Windows), (Availability, 99.6%, Linux), (Availability, 99.7%, Unix).
(Support from location, World).
CL Service: Managed systems: Windows, Red Hat Linux, SuSE Linux, Ubuntu in major versions n and n−1, i.e., the current and preceding versions, e.g., (Systems managed, Red Hat Linux, 7 to 8):
Activities: Install, uninstall, start, stop, monitor, backup, patch for all managed systems (i.e., no upgrade compared to above). Virus-check only for Windows.
(Availability, 99.5%, [Windows, Linux]).
(Support from location, [Argentina, Poland, India]).

In the service subset of the Mainframe node, service selector 53 finds one service (MF) matching all requirements, defined by the following (summarized) attributes:
MF Service:
Managed systems: z/OS, z/Linux, z/VM.
Activities: Install, uninstall, start, stop, monitor, backup, patch, upgrade for all managed systems.
(Availability, 99.9%, z/OS).
(Support from location, World).

Service selector 53 finds two services which match all requirements in the service subset of the Service Desk node, a larger service desk (LD) and a smaller service desk (SD).

These are defined by the following (summarized) attributes:
LD Service:
Managed systems: Windows, Red Hat Linux, SuSE Linux, Ubuntu, AIX, Solaris, HP-Unix, z/OS, z/Linux, z/VM, DB2, Oracle Database, Microsoft SQL Server, Tomcat, WebSphere Application Server, iOS, Android, Blackberry, macOS.
Activities: Store configuration, provide web service request masks.
(Channels, incidents, [web, email, phone]).
(Availability, 99.99%, Service Desk).
(Support from location, World).
SD Service:
Managed systems: Windows, Red Hat Linux, SuSE Linux, Ubuntu, AIX, Solaris, HP-Unix, DB2, Oracle Database, Microsoft SQL Server, Tomcat, WebSphere Application Server, iOS, macOS.
Activities: Store configuration, provide web service request masks.
(Channels, incidents, [web, phone]).
(Availability, 99.9%, Service Desk).
(Support from location, [Argentina, Poland, India]).

Figure 8B:
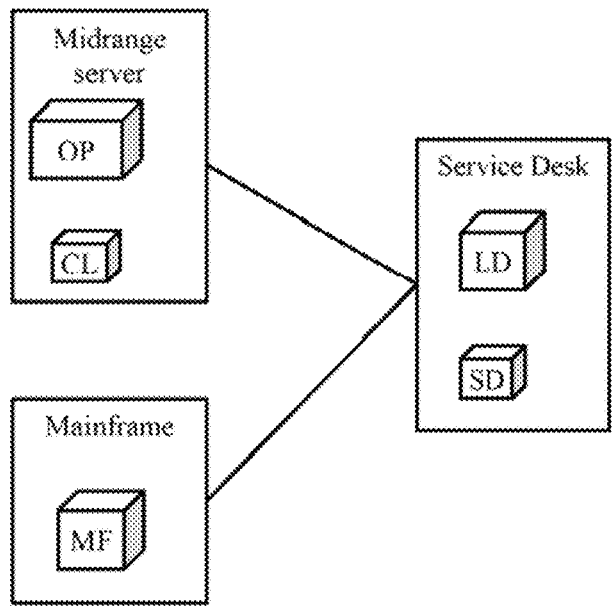

All of the above services also have cost attributes indicating a set of unit costs for managed systems, activities, etc., such that the actual cost of a service can be calculated from the number of systems, activities, etc., specified in a particular requirements subset. For this simple example, it is assumed that the larger, less standardized services have a higher cost than the smaller more standardized services. Hence, OP is more expensive than CL, and LD is more expensive than SD. The services selected to populate the request subgraph are illustrated in FIG. 8b, where the differing service costs are indicated schematically by size of the corresponding service node.

IC selector 54 finds integration components defined for all pairs of selected services connected by master edges in the FIG. 8a request subgraph:
I(OP, LD): This is primarily an adapter between the service interface of service desk LD and the automation scripts within the server management offering. For example, if there is a web mask for ordering Red Hat Linux servers of certain sizes, then the adapter translates this into the more detailed calling parameters of a Red Hat Linux installation script available in OP. In addition, there are communication setups for humans, e.g., when something goes wrong, and for complex service requests that are not automated in OP. The cost, indicated by a cost attribute for I(OP, LD), is low because this is an established component.
I(OP, SD): This is similar to I(OP, LD).
I(CL, LD): This is primarily an adapter between the service interface of service desk LD, and the service interface of the cloud. It is assume here that this adapter has been built, and has similar cost to I(OP, LD) above.
I(CL, SD): It is assume this has not yet been built here but a cost/effort attribute is defined on the basis that an automated adapter is required to avoid losing the reaction speed of the cloud. Unit costs of the adapter code, per service request type and managed system, are estimated from prior similar adapter development and used to estimate a high cost for this adapter.
I(MF, LD): this is similar to I(OP, LD).
I(MF, SD): This has not been built yet but a cost/effort attribute is defined on the basis that less automation and more "swivel-chair" implementation is appropriate than for I(CL, LD) because mainframe service requests occur less often than cloud service requests, and the necessary skills to adapt to the mainframe automation scripts may be less available. The up-front cost and set-up effort will be somewhat lower, giving a lower cost than I(CL, LD).

Figure 8C:
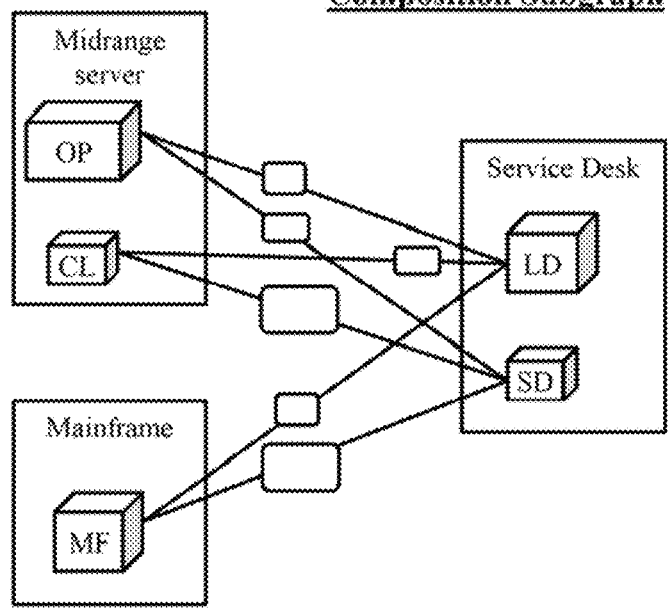

The resulting composition subgraph defined by IC selector 54 is illustrated schematically in FIG. 8c, where the relative cost of integration components is indicated schematically by size of rectangles on edges connecting service pairs.

The set of candidate solutions C can be defined as follows. A solution c∈C is a pair (S', I') where: S'⊆S; I'⊆I; S' contains one service per master node in the request subgraph; and I' contains one integration component for each service pair ($S_1$, $S_2$) in S' interconnected by a master edge in the request subgraph. The candidate solutions thus correspond to paths spanning all master nodes in the composition subgraph. In the (fully integrated) composition subgraph of FIG. 8c, all such paths define candidate solutions.

Figure 8D:
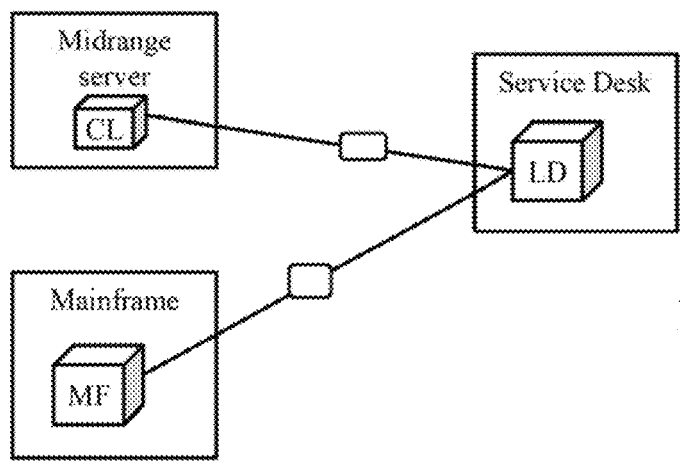

Composition identifier 55 calculates the global attributes of each candidate as described above. In this example, all candidates match all requirements in R', so the evaluation of candidates can be performed solely based on cost. Since I(CL, LD) and I(OP, LD) have roughly equal costs, the composition evaluator 56 will identify the candidate solution (CL, LD, MF) as cheaper than (OP, LD, MF). Using SD instead of LD would require at least one new adapter. This high cost associated with I(CL, SD) is not outweighed by the lower cost of SD. Hence evaluator 56 selects candidate (CL, LD, MF) as the optimal solution as indicated in FIG. 8d. In more complex scenarios however, evaluator may select more than one potential candidate and present the composition data for assessment by a user.

It can be seen that the above embodiment provides a practical and highly efficient system for IT solution composition. It will of course be appreciated that various changes and modifications can be made to the exemplary embodiments described. In one such modification, the requirements set R may be partitioned into a set F of functional requirements and a set N of non-functional requirements. Functional requirements may relate to type and functionality of infrastructure and management services, and non-functional requirements may relate to other, non-functional aspects such as availability, timing, location, etc. Master nodes may be associated with at least one requirement in F. The RSG module may then partition the subset R' into a set F' of the functional requirements and a set N' of the non-functional requirements and define the request subgraph by identifying master nodes which are associated with requirements in F'. This can simplify processing by focusing initially on functional requirements, leaving analysis of non-functional requirements (which are often more relevant for global attributes) to subsequent stages. In particular, the service selector 53 may define the composition subgraph by selecting services (for populating the request subgraph) from services having attributes fulfilling (at least) requirements in F', and the composition evaluator may then compare the composite attributes of candidates with (at least) requirements in N' in order to select the preferred solution(s).

Modules of the solution composition engine may provide outputs to an operator at various stages of the process, e.g. via a GUI, if operator input is desirable. For example, operator input may be used to validate fulfilment assessment, or to validate or assist with automated requirement extraction or selection of preferred candidates.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method for identifying IT service compositions corresponding to subsets of a set R of IT service requirements, the method comprising:
   providing a data structure comprising:
      for a set S of IT services, a master graph having master nodes, representing respective subsets of like services in S, interconnected by master edges each representing an integration-need between nodes interconnected by that edge, wherein each master node is associated with at least one requirement in R;
      for each service in S, attribute data defining a set of attributes of that service; and
      for each of a set I of integration components for integrating service pairs in S, attribute data defining a set of attributes of that component;
   in response to an input request comprising a subset R' of requirements in R, defining a request subgraph comprising master nodes which are associated with requirements in R' and master edges interconnecting those nodes in the master graph;
   defining a composition subgraph by populating the request subgraph with services, selected from all subsets of services represented by master nodes in the request subgraph, having attributes fulfilling requirements in R', and with integration components for pairs of the selected services interconnected by master edges in the request subgraph;
   for each service composition being a set of services, integrated by integration components and spanning all master nodes, in the composition subgraph, comparing the composite attributes of services and integration components in that composition with the requirements in R' to select at least one preferred service composition for R'; and
   outputting composition data defining each preferred service composition.

2. The method as claimed in claim 1, further includes: selecting the preferred service composition in dependence on the extent to which the composite attributes of each composition fulfil requirements in R'.

3. The method as claimed in claim 1, wherein the set of attributes of each service includes a cost attribute indicating a cost metric for that service, the method including selecting the preferred service composition in dependence on the cost metrics for services in each composition.

4. The method as claimed in claim 3, wherein the set of attributes of each integration component comprises a cost attribute indicating a cost metric for that component, the method including selecting the preferred service composition in dependence on the cost metrics for integration components in each composition.

5. The method as claimed in claim 1, wherein the set of services S comprises services for provision of IT infrastructure objects, services for management of IT infrastructure objects, and support services for IT infrastructure objects.

6. The method as claimed in claim 5, wherein the IT infrastructure objects comprise: servers, operating systems, cloud computing systems, datacenters, storage systems, networks, databases, middleware, applications and computing devices.

7. The method as claimed in claim 5, wherein the set of attributes of each service comprises attributes indicating a respective plurality of: a cost metric for the service, object type, object ownership, management activity type, availability, supply-location, delivery-location, support service channel, and provisions of a Service Level Agreement for the service.

8. The method as claimed in claim 1, wherein the set R is partitioned into a set F of functional requirements and a set N of non-functional requirements, and each master node is associated with at least one requirement in F; wherein the method includes partitioning the subset R' into a set F' of the functional requirements and a set N' of the non-functional requirements; and wherein the request subgraph comprises master nodes which are associated with requirements in F'.

9. The method as claimed in claim 8, further includes:
in defining the composition subgraph, selecting services for populating the request subgraph from services having attributes fulfilling requirements in F'; and
for each service composition in the composition subgraph, comparing the composite attributes with requirements in N' to select the preferred service composition.

10. The method as claimed in claim 1, further comprises:
generating the composition data using attributes of services and integration components in the preferred composition.

11. The method as claimed in claim 1, further comprises:
processing a textual input request describing customer requirements to automatically extract the subset of requirements R'.

12. The method as claimed in claim 1, further comprises:
in response to a selection input selecting the preferred service composition after outputting of the composition data, instigating implementation of services in the selected composition.

13. A computing system for identifying IT service compositions corresponding to subsets of a set R of IT service requirements, the system comprising:
memory storing a data structure comprising:
for a set S of IT services, a master graph having master nodes, representing respective subsets of like services in S, interconnected by master edges each representing an integration-need between nodes interconnected by that edge, wherein each master node is associated with at least one requirement in R;
for each service in S, attribute data defining a set of attributes of that service; and
for each of a set I of integration components for integrating service pairs in S, attribute data defining a set of attributes of that component;
control logic comprising:
in response to an input request comprising a subset R' of requirements in R, to define a request subgraph comprising master nodes which are associated with requirements in R' and master edges interconnecting those nodes in the master graph;
to define a composition subgraph by populating the request subgraph with services, selected from all subsets of services represented by master nodes in the request subgraph, having attributes fulfilling requirements in R', and with integration components for pairs of the selected services interconnected by master edges in the request subgraph;
for each service composition being a set of services, integrated by integration components and spanning all master nodes, in the composition subgraph, to compare the composite attributes of services and integration components in that composition with the requirements in R' to select at least one preferred service composition for R'; and
to output composition data, defining each preferred service composition.

14. The system as claimed in claim 13, wherein the control logic is adapted to select the preferred service composition in dependence on the extent to which the composite attributes of each composition fulfil requirements in R'.

15. The system as claimed in claim 13, wherein the set of attributes of each service includes a cost attribute indicating a cost metric for that service and the set of attributes of each integration component comprises a cost attribute indicating a cost metric for that component, and wherein the control logic is adapted to select the preferred service composition in dependence on the cost metrics for services and integration components in each composition.

16. The system as claimed in claim 13, wherein the set of services S comprises services for provision of IT infrastructure objects, services for management of IT infrastructure objects, and support services for IT infrastructure objects.

17. The system as claimed in claim 16, wherein the IT infrastructure objects comprise: servers, operating systems, cloud computing systems, datacenters, storage systems, networks, databases, middleware, applications and computing devices.

18. The system as claimed in claim 16, wherein the set of attributes of each service comprises attributes indicating a respective plurality of: a cost metric for the service, object type, object ownership, management activity type, availability, supply-location, delivery-location, support service channel, and provisions of a Service Level Agreement for the service.

19. The system as claimed in claim 13, further comprises:
generating the composition data using attributes of services and integration components in the preferred composition.

20. A computer program product for identifying IT service compositions corresponding to subsets of a set R of IT service requirements, the computer program product comprising a computer readable storage medium having program instructions embodied therein, the program instructions being executable by a computing system to cause the computing system:
to use a data structure comprising:
for a set S of IT services, a master graph having master nodes, representing respective subsets of like services in S, interconnected by master edges each representing an integration-need between nodes interconnected by that edge, wherein each master node is associated with at least one requirement in R;
for each service in S, attribute data defining a set of attributes of that service, and for each of a set I of integration components for integrating service pairs in S, attribute data defining a set of attributes of that component;

in response to an input request comprising a subset R' of requirements in R, to define a request subgraph comprising master nodes which are associated with requirements in R' and master edges interconnecting those nodes in the master graph;

to define a composition subgraph by populating the request subgraph with services, selected from all subsets of services represented by master nodes in the request subgraph, having attributes fulfilling requirements in R', and with integration components for pairs of the selected services interconnected by master edges in the request subgraph;

for each service composition being a set of services, integrated by integration components and spanning all master nodes, in the composition subgraph, to compare the composite attributes of services and integration components in that composition with the requirements in R' to select at least one preferred service composition for R'; and to output composition data defining each preferred service composition.

* * * * *